US008289999B1

(12) United States Patent
Francis

(10) Patent No.: US 8,289,999 B1
(45) Date of Patent: Oct. 16, 2012

(54) PERMUTATION MAPPING FOR ARQ-PROCESSED TRANSMISSIONS

(75) Inventor: James Covosso Francis, Honeoye Falls, NY (US)

(73) Assignee: L-3 Services, Inc., San Diego, CA (US)

( * ) Notice: Subject to any disclaimer, the term of this patent is extended or adjusted under 35 U.S.C. 154(b) by 567 days.

(21) Appl. No.: 12/613,387

(22) Filed: Nov. 5, 2009

(51) Int. Cl.
*H04J 3/00* (2006.01)

(52) U.S. Cl. ........ 370/476; 370/473; 370/474; 370/487; 370/490; 370/506; 375/240.21; 375/240.22; 375/240.23; 375/240.24; 714/701; 714/702

(58) Field of Classification Search .................. 370/473, 370/474, 476, 487, 490, 506; 375/240.21, 375/240.22, 240.23, 240.24; 714/701, 702
See application file for complete search history.

(56) References Cited

U.S. PATENT DOCUMENTS

| | | | |
|---|---|---|---|
| 2003/0014700 A1* | 1/2003 | Giulietti et al. | 714/701 |
| 2003/0237030 A1* | 12/2003 | Chun | 714/701 |
| 2005/0083880 A1* | 4/2005 | Fukui | 370/329 |
| 2007/0192655 A1* | 8/2007 | Nagaraj | 714/701 |
| 2007/0226550 A1* | 9/2007 | Chaichanavong et al. | 714/701 |
| 2008/0091986 A1* | 4/2008 | Nimbalker et al. | 714/701 |
| 2011/0141994 A1* | 6/2011 | Wengerter et al. | 370/329 |

OTHER PUBLICATIONS

3GPP TSG RAN WG1 #42 bis "Enhancement of Rel.6 Turbo Code," SanDiego,USA,Oct. 10-14,2005,R1-051212,Agenda item: 8.7.*
Lin,Te-Sung Lin; Tsai,Shi-Chun;Tzeng,Wen-Guey, "Efficient Encoding and Decoding with Permutation Arrays," Toronto,Canada,Jul. 6-11,2008.*

* cited by examiner

*Primary Examiner* — Kibrom T Hailu
*Assistant Examiner* — Zewdu A Beyen
(74) *Attorney, Agent, or Firm* — Edward W. Callan

(57) ABSTRACT

A method of communicating individual packets i of K bits includes permutation mapping of the packets, with each permuted packet being denoted by $\Pi_n(i)$, wherein $\Pi_n$ is a permutation on K letters that is unique for each packet transmission. Each permuted packet $\Pi_n(i)$ is modulated to provide a complex vector $x(\Pi_n(i))$ for each packet. The packets are transmitted over a AWGN channel so each individual packet i is received as a variable of the vector $x(\Pi_n(i))$ in a complex vector $y_n = x(\Pi_n(i)) + v_n$, wherein n represents the sequential number of the transmission attempt for a particular packet and $v_n$ represents noise. This method enables the packets to be transmitted while using an improved ARQ routine that includes soft-combining decisions and a constant constellation with a constellation complexity greater than two bits/symbol to thereby significantly improve ARQ-routine performance over the current state of the art.

20 Claims, 3 Drawing Sheets

PERMUTATION MAPPING FOR ARQ-PROCESSED TRANSMISSIONS

BACKGROUND OF THE INVENTION

The present invention generally pertains to telecommunications and is particularly directed to enhancing the efficiency of packet transmission while using an automatic repeat request (ARQ) routine, in which transmission of a particular packet is repeated automatically when correct receipt of said particular packet is not acknowledged within a timeout interval following transmission of the packet. When the transmission of a particular packet is repeated, the multiple transmissions of the particular packet are combined for processing to decide whether the particular packet ultimately has been correctly received.

There have been a number of different ARQ routines. These routines are broadly characterized by whether the combining of the multiple transmissions of the particular packet uses hard or soft decisions, and whether the signal constellation of the received particular packet is constant. Generally, changing the signal constellation and changing the data transmission rate are synonymous.

An early ARQ routine included a constant constellation (data transmission rate) and hard-combining decisions. However, the bit error rate (BER) typically increases rapidly for a constant data transmission rate below a certain threshold signal-to-noise (S/N) ratio, as exemplified by waterfall BER curves. Catastrophic failure occurs below the threshold S/N ratio without regard to the type of data combining. This method was quickly abandoned on channels that exhibit varying S/N ratios.

A subsequent, second ARQ routine included a changing constellation and hard-combining decisions. This routine changes the data transmission rate as the channel S/N ratio varies. It eliminates the catastrophic failure of the earlier ARQ routine, but it has some practical difficulties. If the data transmission rate is too high, (transient) catastrophic failure may occur. If the data transmission rate is too low, the system is inefficient with respect to what data transmission rate may have been attained. On dynamic channels, optimal control of the data transmission rate may be acutely difficult.

A later, third ARQ routine included a constant constellation, soft-combining decisions and a constellation complexity on the order of two bits/symbol. This routine provided a dramatic improvement over the second ARQ routine. Essentially, the data transmission rate remains constant and is not higher than approximately the bandwidth; and the data combining process attains channel capacity (approximately). This routine does not attain data transmission rates significantly greater than the channel bandwidth.

The present state of the art is to use an ARQ routine that includes a simple and immediate extension of the third ARQ routine. This extension uses a changing constellation, soft-combining and constellation complexity that is greater than two bits/symbol. The data transmission rate is the same as for the third routine for rates that are not higher than approximately the bandwidth. For higher data transmission rates, such as for higher order QAM, more complex constellations are used, as in the second ARQ routine. However, there are difficulties associated with data transmission rate control as described above in relation to the second ARQ routine.

SUMMARY OF THE INVENTION

The present invention provides a method of communicating individual packets i of K bits that enables the use of an improved ARQ routine that overcomes the difficulties associated with the prior art ARQ routines. This improved ARQ routine includes soft-combining decisions and a constant constellation with a constellation complexity greater than two bits/symbol to thereby significantly improve ARQ-routine performance over the current state of the art. This improved ARQ routine overcomes the difficulties in the current state of the art in the same way that the third ARQ routine overcame the difficulties associated with the earlier ARQ routines. The third ARQ routine eliminated the difficulties of controlling rate and dramatically improved on the preceding methods. This improved ARQ routine eliminates the difficulties associated with controlling the data transmission rate for rates greater than the bandwidth and thereby represents an improvement over the current state of the art. Also, with this improved ARQ routine, data transmission rates greater than the bandwidth can be used when the S/N ratio is relatively large.

The method of the present invention is a method of communicating individual packets i of K bits, comprising the steps of:

(a) performing permutation mapping of the packets, with each permuted packet being denoted by $\Pi_n(i)$, wherein $\Pi_n$ is a permutation on K letters that is unique for each packet transmission;

(b) modulating $\Pi_n(i)$ to provide a complex vector $x(\Pi_n(i))$ for each packet; and (c) transmitting the packets so that the transmission of each individual packet i is received as a variable of the vector $x(\Pi_n(i))$ in a complex vector $y_n = x(\Pi_n(i)) + v_n$, wherein n represents the sequential number of the transmission attempt for a particular packet and $v_n$ represents noise.

The recitation that $\Pi$ is a permutation that is unique for each packet transmission means that permutation $\Pi$ is unique for each transmission of each packet in a sequence of individual packets, including each of any repeated transmissions of any of the individual packets.

The term permutation ordinarily means a mapping that is bijective, but it is to be understood that in accordance with the present invention the term permutation also means a mapping that is not necessarily bijective.

The present invention additionally provides a system for performing the above-described method and computer readable storage media including computer executable program instructions for causing one or more computers to perform and/or enable the steps of the respective above-described method.

Additional features of the present invention are described with reference to the detailed description of the preferred embodiments.

DETAILED DESCRIPTION

Figure 1:
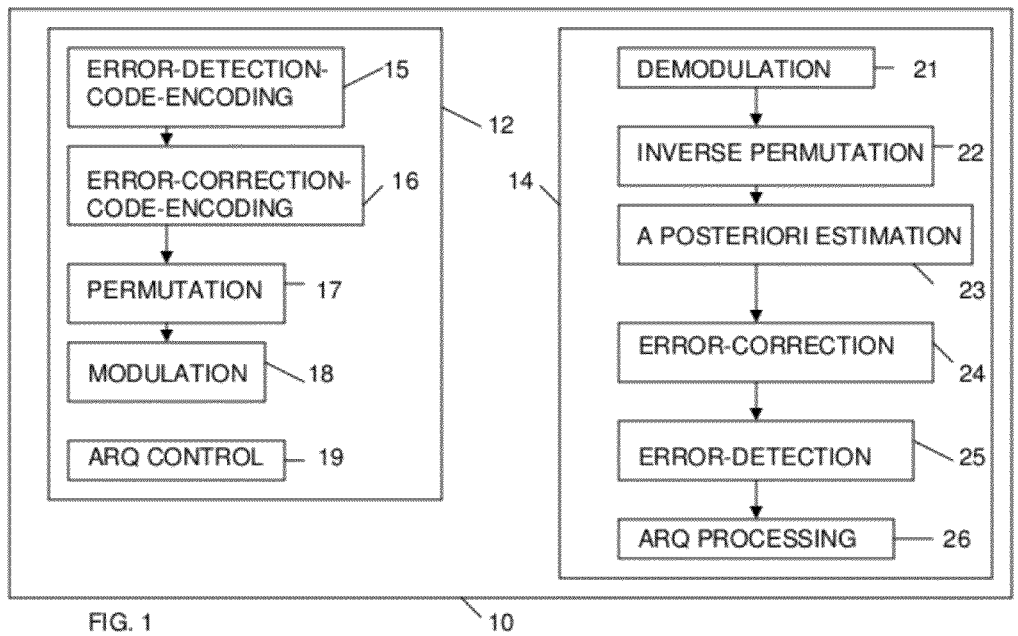
FIG. 1 is a block diagram of a modem illustrating various routines executed by the modem for performing an exemplary embodiment of the method of the present invention.

Referring to FIG. 1, a modem 10 containing an exemplary embodiment of a system for performing the method of the present invention includes a transmitter section 12 and a receiver section 14. The transmitter section 12 executes an error-detection-code-encoding routine 15, an error-correction-code-encoding routine 16, a permutation routine 17, a modulation routine 18 and an ARQ control routine 19. The receiver section 14 executes a demodulation routine 21, an inverse permutation routine 22, an a posteriori estimation routine 23, an error-correction 24, an error-detection routine 25 and an ARQ processing routine 26.

The transmitter section 12 and the receiver section 14 of a given modem 10 share a computer system (not shown) within the modem 10. The computer system contains computer readable storage media that includes computer executable program instructions for causing the computer to execute the routines of the transmitter section 12 and the receiver section 14 that are described herein. These instructions are stored in computer readable storage media of the computer when the computer is manufactured and/or upon being downloaded via the Internet or from portable computer readable storage media containing such instructions. The computer system may be embodied in a combination of physically discrete computers, with the routines described herein being executed by the combination of discrete computers.

Figure 2:
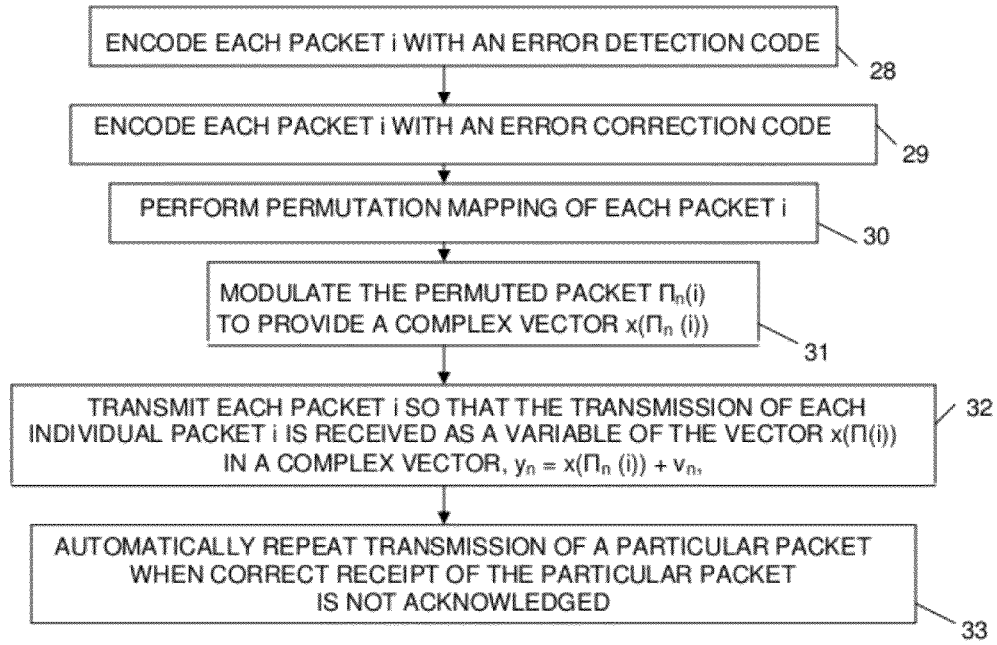
FIG. 2 is a diagram illustrating some of steps that are performed in the transmitter section of the modem shown in FIG. 1.

In the transmitter section 12, the error-detection-code-encoding routine 15 is executed to encode each packet i in a sequence of individual packets that are to be communicated with an error detection code, as shown at 28 in FIG. 2. Next, the error-correction-code-encoding routine 16 is executed to further encode each packet i with an error correction code, as shown at 29 in FIG. 2.

Next, the permutation routine 17 is executed to perform permutation mapping of each particular packet i, as shown at 30 in FIG. 2, with each permuted packet i being denoted by $\Pi_n(i)$. $\Pi_n$ is a permutation on K letters that is unique for each transmission of each packet in a sequence of individual packets, including each of any repeated transmissions of any of the individual packets. n represents the sequential number of the transmission attempt for a particular packet. The K letters are the positions of the K bits. In some embodiments, i is a binary vector of length K, and $\Pi_n$ may be taken from a set of permutations that does not include all of a symmetric group on K letters.

Next, the modulation routine 18 is executed to modulate the permuted packet $\Pi_n(i)$ to provide a complex vector $x(\Pi_n(i))$ for each packet, as shown at 31 in FIG. 2. The modulator 19 uses $2^M$-ary PSK modulation. K bits are partitioned into blocks of M bits and each block of bits is mapped onto a PSK symbol to obtain a sequence of $$\frac{K}{M}$$

PSK symbols so that x denotes a complex $$\frac{K}{M}\text{-tuple vector.}$$

tuple vector. The PSK symbols use a Gray code in some, but not necessarily all, embodiments. In alternative embodiments, some other type of modulation, such a QAM, may be used.

The transmitter section 12 causes the packets to be transmitted over a complex AWGN (additive white Gaussian noise) channel so that the transmission of each individual packet i is received as a variable of the vector $x(\Pi(i))$ in a complex vector, $$y_n = x(\Pi_n(i)) + v_n, \qquad [\text{Eq. 1}]$$

as shown at 32 in FIG. 2. For a sequence of individual packets $i_a, i_b, \ldots$, the transmission of the sequence of individual packets i is received as, $$y_{an} = x(\Pi_{an}(i_a)) + v_{an}, \, y_{bn} = x(\Pi_{bn}(i_b)) + v_{bn}, \qquad [\text{Eq. 2}]$$

The ARQ control routine 19 is executed to cause transmission of a particular packet to be repeated automatically by the transmitter section 12 when correct receipt of the particular packet is not acknowledged to the transmitter section 12 within a timeout interval following transmission of the particular packet, as shown at 33 in FIG. 2. When correct receipt of the particular packet is acknowledged to the transmitter section 12 within the timeout interval, the ARQ control routine 19 causes the transmitter section to transmit the next packet i in the sequence of individual packets.

Figure 3:
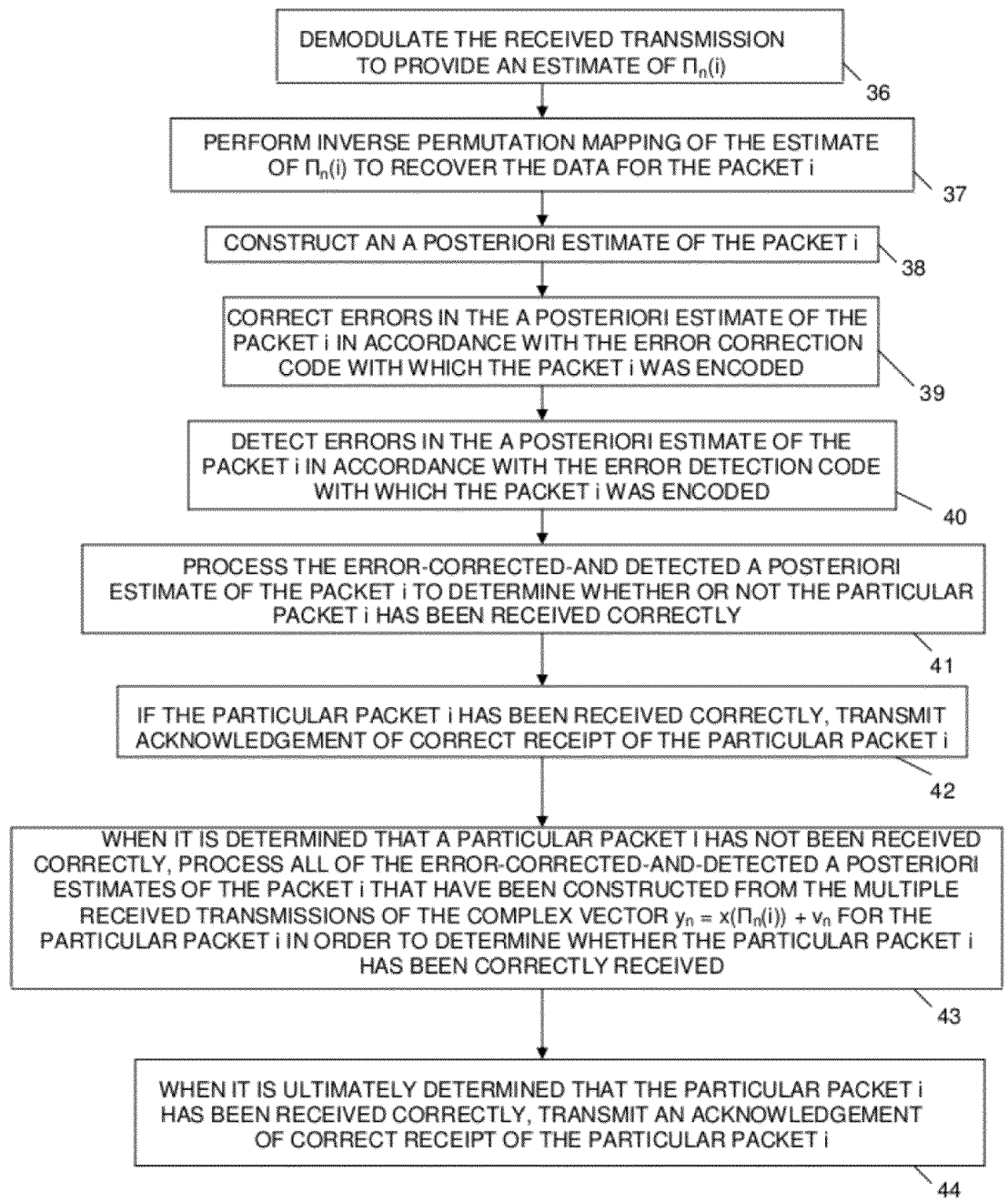
FIG. 3 is a diagram illustrating some of steps that are performed in the receiver section of the modem shown in FIG. 1.

When a transmission received by the modem 10 has been processed by a transmitter section in another modem, such as the transmitter section 12 described above, the receiver section 14 of the modem 10, processes the received transmission as follows:

The demodulation routine 21 is executed to demodulate the received transmission in order to provide an estimate of $\Pi_a(i)$ in soft bits for each transmission of $y_n$, as shown at 36 in FIG. 3.

Next, the inverse permutation routine 22 is executed to perform inverse permutation mapping of the estimate of $\Pi_a(i)$ in order to recover the data for the packet i included in the received transmission of $y_n$, as shown at 37 in FIG. 3. The permutation sequence $\Pi_1, \Pi_2, \Pi_3, \ldots$, is known a priori to both the permutation routine 18 in the modem 10 from which the vector $x(\Pi_n(i))$ is transmitted and the inverse permutation routine 22 in the modem 10 that receives the complex vector $y_n = x(\Pi_n(i)) + v_n$. The a priori permutation sequence $\Pi_1, \Pi_2, \Pi_3, \ldots$, may be generated by a pseudo-random sequence generator in each modem.

Next, the a posteriori estimation routine 23 is executed to construct an a posteriori estimate of the packet i, as shown at 38 in FIG. 3.

Next, the error-correction routine 24 is executed to correct errors in the a posteriori estimate of the error-correction-code-encoded packet i, as shown at 39 in FIG. 3. The error-correction routine 24 is executed in accordance with the error correction code with which the packet i was encoded by the error-correction-code-encoding routine 16 executed in the modem from which the particular vector $x(\Pi_n(i))$ was transmitted.

Next, the error-detection routine 25 is executed to detect any errors that remain in the error-corrected a posteriori estimate of the packet i, as shown at 40 in FIG. 3. The error-detection routine 25 is executed in accordance with the error detection code with which the packet i was encoded by the error-detection-code-encoding routine 15 executed in the modem from which the particular vector $x(\Pi_n(i))$ was transmitted.

Next, the ARQ processing routine 26 is executed to process the error-corrected-and-detected a posteriori estimate of the packet i in order to determine whether or not the particular packet i has been received correctly, as shown at 41 in FIG. 3.

If the ARQ processing routine 26 determines that the particular packet i has been received correctly, the ARQ processing routine 26 causes the transmitter section 12 of the modem in which the transmission is received to transmit an acknowledgement of correct receipt of the particular packet to the modem from which the transmission has been received, as shown at 42 in FIG. 3. The acknowledgment is transmitted within the timeout interval.

When the ARQ processing routine 26 determines that a particular packet i has not been received correctly, routines 21, 22, 23, 24 and 25 are executed for each of the received repeated transmissions of the vector $x(\Pi_n(i))$ and the ARQ processing routine 26 is executed to process all of the error-corrected-and-detected a posteriori estimates of the packet i that have been constructed from the multiple received transmissions of the complex vector $y_n = x(\Pi_n(i)) + v_n$ for the particular packet i in order to determine whether or not the particular packet i has been correctly received, as shown at 43 in FIG. 3. The multiple received transmissions of the complex vector $y_n = x(\Pi_n(i)) + v_n$ for the particular packet i are expressed as:

$$y_1 = x(\Pi_1(i)) + v_1$$
$$y_2 = x(\Pi_2(i)) + v_2$$
$$y_3 = x(\Pi_3(i)) + v_3$$
$$\vdots$$

[Eq. 3]

When the ARQ processing routine 26 ultimately determines that the particular packet i has been received correctly, the ARQ processing routine 26 causes the transmitter section 12 of the modem in which the transmission is received to transmit an acknowledgement of correct receipt of the particular packet i to the modem from which the transmission has been received, as shown at 44 in FIG. 3. The acknowledgment is transmitted within the timeout interval.

The memory requirements do not increase with the number of transmission attempts for a particular packet i. If all K bits are received correctly on the nth attempt, the resulting throughput is M/n bits/symbol.

In the preferred embodiment, the ARQ processing routine 26 is executed in accordance with the above described improved ARQ routine that includes soft-combining decisions and a constant constellation with a constellation complexity greater than two bits/symbol to determine whether or not the particular packet i has been received correctly. In alternative embodiments, the ARQ processing routine 26 may be in accordance with some other ARQ routine in order to determine whether or not the particular packet i has been received correctly.

The performance of the ARQ processing routine 26 that is executed in accordance with the above described improved ARQ routine when processing the a posteriori estimates of the packet i that are constructed from multiple received transmissions of the complex vector $y_n = x(\Pi_n(i)) + v_n$ for a particular packet was measured in Mathematica. 128-bit packets were used. With 2-ary PSK and a symbol S/N ratio of 20 dB, the throughput was measured to be 0.98-bits/symbol. With 2-ary PSK and a symbol S/N ratio of 0 dB, the throughput was measured to be 0.23-bits/symbol. With 8-ary PSK and a symbol S/N ratio of 20 dB, the throughput was measured to be 3.00-bits/symbol. With 8-ary PSK and a symbol S/N ratio of 0 dB, the throughput was measured to be 0.23-bits/symbol. Thus, on a nearly noiseless channel the throughput was close to M bits/symbol, as expected. On a noisy channel with a S/N ratio of 0 dB, the throughput using 2-ary PSK was the same as the throughput using 8-ary PSK. This performance is consistent with analytical prediction.

Previously, the performance of the ARQ processing routine 26 that is in accordance with the above described improved ARQ routine when processing the a posteriori estimates of the packet i that are constructed from multiple received transmissions of a complex vector $y_n = x(i) + v_n$ for the particular packet when there has been no permutation of the packet i was measured in Mathematica. 128-bit packets were used. With 2-ary PSK and a symbol S/N ratio of 20 dB, the throughput was measured to be 0.98-bits/symbol. With 2-ary PSK and a symbol S/N ratio of 0 dB, throughput was measured to be 0.24 bits/symbol. With 8-ary PSK and a symbol S/N ratio of 20 dB, throughput was measured to be 3.00-bits/symbol. With 8-ary PSK and a symbol S/N ratio of 0 dB, throughput was measured to be 0.12-bits/symbol. Thus, on a nearly noiseless channel the throughput was close to M bits/symbol, as expected. However, on a noisy channel with a S/N ratio of 0 dB, the throughput using 2-ary PSK was much higher than the throughput using 8-ary PSK.

For the two Mathematica measurements described above, it was assumed that there is no error correction, the error detection is perfect and requires no overhead, and the acknowledge/not acknowledge is perfect and requires no overhead.

The following is an explanation as to why permutation mapping of the vector x(i) overcomes this problem of throughput discrepancy for noisy channel transmissions follows.

Recall from information theory that the capacity of a discrete memoryless channel (DMC) with input x and output y is defined to be the maximum value of the mutual information between x and y, I(x, y), where the maximum is computed over all possible probability density functions (pdf) for the input x. Mutual information is defined as $I(x, y) = H(x) - H(x|y)$, where H(x) is the entropy of x and H(x|y) is the condition entropy of x given y.

Figure 4:
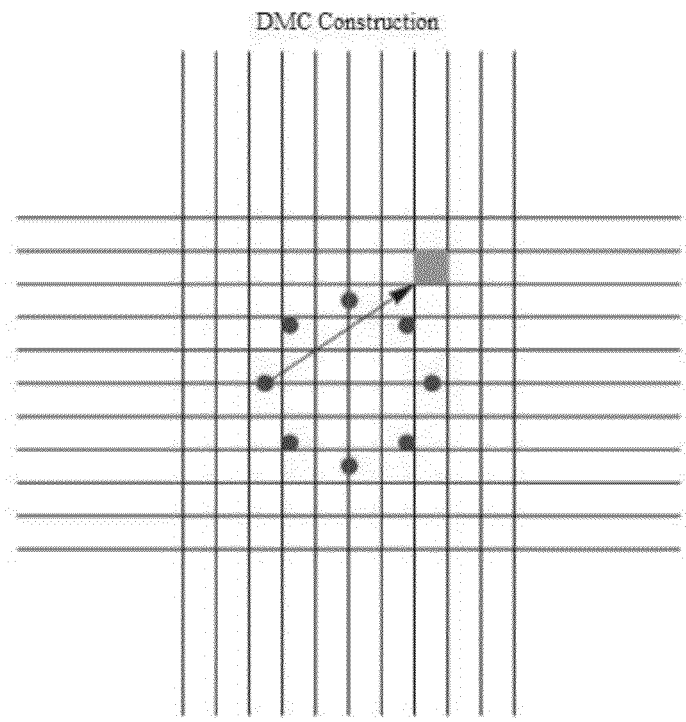
FIG. 4 is a DMC construction of the transmission of a single PSK symbol in an AWGN channel.

Channel capacity may be computed using the Arimoto-Blahut algorithm. To apply this algorithm one may construct a suitable DMC model and compute the transition probabilities p(y|x). This may be done as follows. Consider the transmission of a single PSK symbol in an AWGN channel, a DMC construction of which in shown in FIG. 4. For concreteness assume 8-ary PSK. The input x and y may be regarded as $$x \in \left\{ e^{i\frac{2\pi}{8}k} \right\}$$

and the output $y \in \mathbb{C}^2$. The output y is infinite (i.e. the cardinality of the set from which y is taken). To make y finite construct a collection of rectangles $\{R_n\}$ such that the union of this collection is all of $y \in \mathbb{C}^2$. By making the rectangles sufficiently dense in the region where most of the probability mass of (y|x) resides, one may satisfactorily approximate the continuous channel with a discrete channel. That is, $y \in \{R_n\}$. p(y|x) is then given by the probability that the noise translates the PSK symbol into the respective $R_n$. With AWGN this is simply a product of Q functions.

This construction and computation was performed in Mathematica. With 2-ary PSK and a symbol S/N ratio of 0 dB, the computed capacity was 0.72-bits/symbol. With 8-ary PSK and a symbol S/N ratio of 0 dB, the computed capacity was 0.97-bits/symbol.

The capacity of 8-ary PSK is greater the capacity of 2-ary PSK, and this is as it must be. After all, 2-ary PSK is a subset of 8-ary PSK, and the pdf for x that maximizes I(x,y) for 2-ary PSK is also a choice for 8-ary PSK. The 8-ary PSK symbols that are not 2-ary PSK symbols may be assigned zero probability. What is interesting is that in all cases for $2^M$-ary PSK, the pdf for x that realizes capacity is uniform. It is a standard result that for a symmetric DMC the input pdf for x that maximizes I(x,y) is uniform, but this channel is not a symmetric DMC. It might seem that some other distribution may be optimal, but this is simply not the case. For example, the optimal pdf for x for 8-ary PSK might have been that of 2-ary PSK.

8-ary PSK capacity is greater than 2-ary PSK capacity, and uniform input distribution attains capacity. The communication system using ARQ and 8-ary PSK must outperform 2-ary PSK. Without permutation mapping, the received transmissions are:

$y_1 = x + v_1$ $y_2 = x + v_2$ $y_3 = x + v_3$

.

.

.  [Eq. 4]

Figure 5:
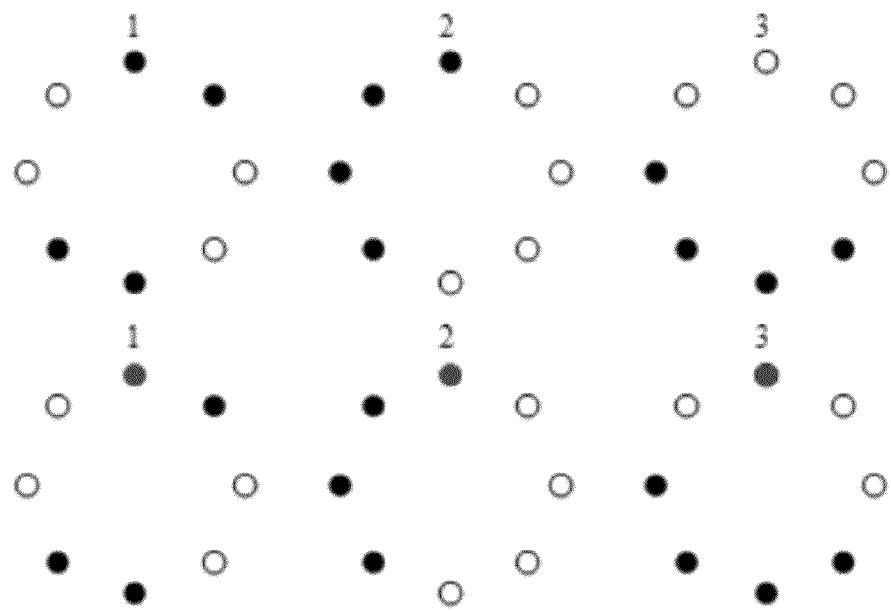
FIG. 5 is a graphic representation exemplifying Gray coding of 8-ary PSK constellations.

Now, refer to FIG. 5, which is a graphic representation of exemplary Gray-coded 8-ary PSK constellations. The constellations on the left side are labeled 1, the constellations in the center are labeled 2 and the constellations on the right side are labeled 3. In the left constellations, the black symbols are associated with bit-1=1, and the white symbols are associated with bit-1=0. In the center constellations, the black symbols are associated with bit-2=1, and the white symbols are associated with bit-2=0. In the left constellations, the black symbols are associated with bit-3=1, and the white symbols are associated with bit-3=0. For any bit, exactly half of the symbols of such a constellation represent a bit value of 1 and half of the symbols represent a bit value of 0. A processor in the receiver decides each bit value by examining whether this symbol is a black or a white symbol for the respective bit position. This assumes no noise, of course. This determines the mapping used for transmission. For example, In order to transmit (bit 1, bit 2, bit 3)=(1, 1, 0) the transmitter would select the top center symbols in the bottom row of constellations 1, 2, 3, or $$x = e^{i\frac{2\pi}{8}2} = i.$$

Now, consider first the transmission of x=i. Notice that for bit position 3 the top center symbol is white (in the top row of constellations), whereby bit-3=0. The two adjacent symbols are also white, and thereby would also represent bit-3=0. Thus if the noise is relatively small the correct symbol and its nearest neighbors, which represent the next-most likely received symbols, will result in the receiver processor deciding that bit-3=0. For x=i. bit-3=0 may be thought of as a "strong" bit, in the sense that it is less likely that an error will occur in this bit position for this x. Bit-2 is a different story.

For bit position 2 the top center symbol is a black, whereby bit-2=1. Observe that one neighboring symbol in this bit-2 position represents bit 2=1, but the other represents an incorrect bit 2=0. Thus the transmission of bit 2=1 is "weak" relative to bit 3=0.

Any part of x that is weak, is weak in all transmissions. Because the data is not received until all bits are received, the throughput is determined by the weakest parts of x. This problem is overcome by using permutation over time to map the transmitted bits onto the PSK constellation so the received transmission of x is as expressed above in Equation 3.

The a posteriori estimation routine 23 constructs the a posteriori estimate of the packet i by optimal calculation of bit probability. Consider the transmission of M bits and a single symbol. One modem transmits x and another modem observes y=x+v. Using Bayes' rule and assuming that x is uniformly distributed, $$P(x|y) = \frac{P(x,y)}{P(y)} = \frac{P(y|x)P(x)}{P(y)} = \frac{P(y|x)P(x)}{\sum_{x'} P(x',y)} \quad [\text{Eq. 5}]$$

$$= \frac{P(y|x)P(x)}{\sum_{x'} P(y|x')P(x')} = \frac{P(y|x)\frac{1}{2^M}}{\sum_{x'} P(y|x')\frac{1}{2^M}} = \frac{P(y|x)}{\sum_{x'} P(y|x')}$$

$$= \frac{\frac{1}{2\pi\sigma^2} e^{-\frac{|y-x|^2}{2\sigma^2}}}{\sum_{x'} \frac{1}{2\pi\sigma^2} e^{-\frac{|y-x'|^2}{2\sigma^2}}} = \frac{e^{-\frac{|y-x|^2}{2\sigma^2}}}{\sum_{x'} e^{-\frac{|y-x'|^2}{2\sigma^2}}}$$

σ represents the power of the noise.

Referring to the constellation 1 in the upper left corner of FIG. 5, let S1 denote the set of symbols where bit-1=1 (i.e. the black symbols). Then, $$P(bit\ 1 = 1|y) = \sum_{x \in S1} P(x|y) = \sum_{x \in S1} \frac{e^{-\frac{|y-x|^2}{2\sigma^2}}}{\sum_{x'} e^{-\frac{|y-x'|^2}{2\sigma^2}}} \quad [\text{Eq. 6}]$$

$$= \frac{\sum_{x \in S1} e^{-\frac{|y-x|^2}{2\sigma^2}}}{\sum_{x'} e^{-\frac{|y-x'|^2}{2\sigma^2}}}$$

P(bit 1=0|y) is similarly constructed on the complement of S1.

Consider now the question of combining multiple transmissions. In the expression P(bit 1=1|y)=$\sum_{x \in S1} P(x|y)$ one may simply regard y and x as vector quantities. y is a received noisy PSK sequence (i.e. the tuples of Y). S1 is the set of all ideal PSK sequences with bit 1=1, and x is an element of this set. Thus, $$P(x|y) = P(x_1, x_2, x_3, \ldots | y_1, y_2, y_3, \ldots) \quad [\text{Eq. 7}]$$

$$= P(v_1, v_2, v_3, \ldots) = \prod_i P(v_i) = \frac{1}{(2\pi\sigma^2)^N} e^{-\frac{\|v\|^2}{2\sigma^2}}$$

Therefore, Equation 6 holds as is, with the understanding that y and x are vectors. With an unconstrained permutation, the cardinality of S1 increases exponentially with the length of y. However, it turns out that it is sufficient to only permute the bits within each PSK symbol. The resulting cardinality of S1 is $2^{M-1}$ and the memory requirements are constant.

In one embodiment, wherein y is a vector with tuples from all or any subset of the received transmissions of $y_n$ for a particular packet, the a posteriori estimation routine 23 constructs an a posteriori estimate of i in accordance with $$P(bit\ k = 1 | y) = \frac{\sum_{x \in S1,k} e^{-\frac{\|y-x\|^2}{2\sigma^2}}}{\sum_{x'} e^{-\frac{\|y-x'\|^2}{2\sigma^2}}} \qquad [\text{Eq. 8}]$$

In another embodiment, wherein the transmission is over a complex AWGN channel, and y is a vector with tuples from all or any subset of the received transmissions of $y_n$ for a particular packet, the a posteriori estimation routine 23 constructs an a posteriori estimate of i in accordance with $$P(bit\ k = 1 | y) = \frac{\sum_{x \in S1,k} e^{-\frac{\|y-x\|^2}{2\sigma^2}}}{\sum_{x'} e^{-\frac{\|y-x'\|^2}{2\sigma^2}}} \qquad [\text{Eq. 9}]$$

In alternative embodiments, the modem is not adapted for executing the error-detection-code-encoding routine 15 and the error-detection-code-decoding routine 26 and/or the error-correction-code-encoding routine 16 and the error-control-code-decoding routine 25 and/or the ARQ control routine 19 and the ARQ processing routine 26.

Regarding the method claims, except for those steps that can only occur in the sequence in which they are recited, and except for those steps for which the occurrence of a given sequence is specifically recited or must be inferred, the steps of the method claims do not have to occur in the sequence in which they are recited.

The benefits specifically stated herein do not necessarily apply to every conceivable embodiment of the present invention. Further, such stated benefits of the present invention are only examples and should not be construed as the only benefits of the present invention.

While the above description contains many specificities, these should not be construed as limitations on the scope of the present invention, but rather as examples of the preferred embodiments described herein. Other variations are possible and the scope of the present invention should be determined not by the embodiments described herein but rather by the claims and their legal equivalents.

The invention claimed is:

1. A method of communicating individual packets i of K bits, comprising steps of:
    (a) performing permutation mapping of the packets, with each permuted packet being denoted by $\Pi_n(i)$, wherein $\Pi_n$ is a permutation on K letters that is unique for each packet transmission, wherein i denotes a particular individual packet and the K letters are the positions of the K bits;
    (b) modulating $\Pi_n(i)$ to provide a complex vector $x(\Pi_n(i))$ for each packet; and
    (c) transmitting the packets so that the transmission of each individual packet i is received as a variable of the complex vector $x(\Pi_n(i))$ in a complex vector $y_n = x(\Pi_n(i)) + v_n$, wherein n represents the sequential number of the transmission attempt for a particular packet and $v_n$ represents noise.

2. A method according to claim 1, wherein for a sequence of individual packets $i_a, i_b, \ldots$, step (c) comprises a step of:
    (d) transmitting the packets so that the transmission of the sequence of individual packets i is received as $y_{an} = x(\Pi_{an}(i_a)) + v_{an}, y_{bn} = x(\Pi_{bn}(i_b)) + v_{bn}, \ldots$.

3. A method according to claim 1, further comprising the step of:
    (d) constructing an a posteriori estimate of the packet i from a received transmission of the complex vector $y_n$.

4. A method according to claim 3, wherein step (d) comprises a step of:
    (e) constructing an a posteriori estimate of the packet i in accordance with $$P(bit\ k = 1 | y) = \sum_{x \in S1,k} P(x | y)$$

wherein k denotes a particular bit of the K bits and S1 denotes the set of symbols where bit-1=1, and y is a vector with tuples from all or any subset of the received transmission of the complex vector $y_n$.

5. A method according to claim 3, wherein the transmission is over a complex AWGN channel, y is a vector with tuples from all or any subset of the received transmission of the complex vector $y_n$, and step (d) comprises a step of:
    (e) constructing an a posteriori estimate of the packet i in accordance with $$P(bit\ k = 1 | y) = \frac{\sum_{x \in S1,k} e^{-\frac{\|y-x\|^2}{2\sigma^2}}}{\sum_{x'} e^{-\frac{\|y-x'\|^2}{2\sigma^2}}}$$

wherein $\sigma$ represents the power of the noise, and S1 denotes the set of symbols where bit-1=1.

6. A method according to claim 1, wherein i is a binary vector of length K, and $\Pi$ is taken from a set of permutations that does not include all of a symmetric group on K letters.

7. A method according to claim 1 performed while executing an automatic repeat request (ARQ) routine in which transmission of a particular packet is repeated automatically when correct receipt of the particular packet is not acknowledged within a timeout interval following transmission of the particular packet, wherein the ARQ routine includes soft-combining decisions and a constant constellation with a constellation complexity greater than two bits-per-symbol.

8. A system for communicating individual packets i of K bits, comprising: a computer section containing a computer and computer readable storage media that includes computer executable instructions for causing the computer to execute routines of: (a) performing permutation mapping of the packets, with each permuted packet being denoted by $\Pi_n(i)$, wherein $\Pi_n$ is a permutation on K letters that is unique for each packet transmission, wherein i denotes a particular individual packet and the K letters are the positions of the K bits; and (b) modulating $\Pi_n(i)$ to provide a complex vector $x(\Pi_n(i))$ for each packet; and (c) transmitting the packets so that the transmission of each individual packet i is received as a variable of the complex vector $x(\Pi_n(i))$ in a complex vector $y_n = x(\Pi_n(i)) + v_n$, wherein n represents the sequential number of the transmission attempt for a particular packet and $v_n$ represents noise.

9. A system according to claim 8, wherein the-computer readable storage media also includes computer executable instructions for causing the computer to execute a routine of:

(d) constructing an a posteriori estimate of the packet i from a received transmission of the complex vector $y_n$.

10. A system according to claim 9, wherein the computer executable instructions for causing the computer to execute routine (d) are adapted for causing the computer to construct said a posteriori estimate in accordance with $$P(bit\ k = 1 \mid y) = \sum_{x \in S1,k} P(x \mid y)$$

when y is a vector with tuples from all or any subset of the received transmission of the complex vector $y_n$, wherein k denotes a particular bit of the K bits and S1 denotes the set of symbols where bit-1=1, and y is a vector with tuples from all or any subset of the received transmission of the complex vector $y_n$.

11. A system according to claim 10, wherein the computer executable instructions for causing the computer to execute routine (d) are adapted for causing the computer to construct said a posteriori estimate in accordance with $$P(bit\ k = 1 \mid y) = \frac{\sum_{x \in S1,k} e^{-\frac{\|y-x\|^2}{2\sigma^2}}}{\sum_{x'} e^{-\frac{\|y-x'\|^2}{2\sigma^2}}}$$

when the transmission is over a complex AWGN channel and y is a vector with tuples from all or any subset of the received transmission of the complex vector $y_n$, wherein k denotes a particular bit of the K bits and S1 denotes the set of symbols where bit-1=1, and y is a vector with tuples from all or any subset of the received transmission of the complex vector $y_n$.

12. A system according to claim 8, wherein i is a binary vector of length K, and $\Pi$ is taken from a set of permutations that does not include all of a symmetric group on K letters.

13. A system according to claim 8, wherein the computer readable storage media also includes computer executable instructions for causing the computer to execute an automatic repeat request (ARQ) routine in which transmission of a particular packet is repeated automatically when correct receipt of the particular packet is not acknowledged within a timeout interval following transmission of the particular packet, wherein the ARQ routine includes soft-combining decisions and a constant constellation with a constellation complexity greater than two bits-per-symbol.

14. A non-transitory computer readable storage medium for use with a computer in a system for communicating individual packets i of K bits, wherein the computer readable storage medium contains computer executable program instructions for causing the computer to perform steps of: (a) performing permutation mapping of the packets, with each permuted packet being denoted by $\Pi_n(i)$, wherein $\Pi_n$ is a permutation on K letters that is unique for each packet transmission, wherein i denotes a particular individual packet and the K letters are the positions of the K bits; and (b) modulating $\Pi_n(i)$ to provide a complex vector $x(\Pi_n(i))$ for each packet, so that the transmission of each individual packet i by the system is received as a variable of the complex vector $x(\Pi_n(i))$ in a complex vector $y_n = x(\Pi_n(i)) + v_n$, wherein n represents the sequential number of the transmission attempt for a particular packet and $v_n$ represents noise.

15. A non-transitory computer readable storage medium according to claim 14, wherein for a sequence of individual packets $i_a, i_b, \ldots$, the transmission of the sequence of individual packets i is received as $y_{an} = x(\Pi_{an}(i_a)) + v_{an}$, $y_{bn} = x(\Pi_{bn}(i_b)) + v_{bn}, \ldots$.

16. A non-transitory computer readable storage medium according to claim 14, wherein the computer readable storage medium also contains computer executable program instructions for causing the computer to perform a step of:

(c) constructing an a posteriori estimate of the packet i from a received transmission of the complex vector $y_n$.

17. A non-transitory computer readable storage medium according to claim 16, wherein step (c) comprises a step of:

(d) constructing the a posteriori estimate of the packet i in accordance with $$P(bit\ k = 1 \mid y) = \sum_{x \in S1,k} P(x \mid y)$$

when y is a vector with tuples from all or any subset of the received transmission of the complex vector $y_n$, wherein k denotes a particular bit of the K bits and S1 denotes the set of symbols where bit-1=1.

18. A non-transitory computer readable storage medium according to claim 16, wherein step (c) comprises a step of:

(d) constructing the a posteriori estimate of the packet i in accordance with $$P(bit\ k = 1 \mid y) = \frac{\sum_{x \in S1,k} e^{-\frac{\|y-x\|^2}{2\sigma^2}}}{\sum_{x'} e^{-\frac{\|y-x'\|^2}{2\sigma^2}}}$$

when the transmission is over a complex AWGN channel and y is a vector with tuples from all or any subset of the received transmission of the complex vector $y_n$, wherein $\sigma$ represents the power of the noise and S1 denotes the set of symbols where bit-1=1.

19. A non-transitory computer readable storage medium according to claim 14, wherein i is a binary vector of length K, and Π is taken from a set of permutations that does not include all of a symmetric group on K letters.

20. A non-transitory computer readable storage medium according to claim 14, wherein the computer readable storage medium also contains computer executable program instructions for causing the computer to perform the step of: (c) executing an automatic repeat request (ARQ) routine in which transmission of a particular packet is repeated automatically when correct receipt of the particular packet is not acknowledged within a timeout interval following transmission of the particular packet, wherein the ARQ routine includes soft-combining decisions and a constant constellation with a constellation complexity greater than two bits-per-symbol.

* * * * *

UNITED STATES PATENT AND TRADEMARK OFFICE
CERTIFICATE OF CORRECTION

PATENT NO. : 8,289,999 B1
APPLICATION NO. : 12/613387
DATED : October 16, 2012
INVENTOR(S) : James Covosso Francis It is certified that error appears in the above-identified patent and that said Letters Patent is hereby corrected as shown below:

at column 4, line 1, "tuple vector." should be omitted
at column 4, line 33, "$\text{II}_a(i)$" should be --$\text{II}_n(i)$--
at column 4, line 37, "$\text{II}_a(i)$" should be --$\text{II}_n(i)$--
at column 6, line 61, insert --p-- before --(y|x)--
at column 8, line 57, "Y" should be --y--

Signed and Sealed this
Twenty-sixth Day of February, 2013

Teresa Stanek Rea
*Acting Director of the United States Patent and Trademark Office*